Patented Mar. 8, 1949

2,464,189

UNITED STATES PATENT OFFICE 2,464,189

SUGAR CANE WAX REFINING

Oscar J. Swenson, Ithaca, N. Y., assignor to Colonial Sugars Company, New York, N. Y., a corporation of New Jersey, and S. C. Johnson & Son, Inc., Racine, Wis., a corporation of Wisconsin No Drawing. Application July 12, 1946, Serial No. 683,138

5 Claims. (Cl. 260—428.5)

This invention relates to the refining of sugar cane wax, and more particularly relates to a process for removing the resinous fraction from sugar cane wax.

Various methods are known for separating crude sugar cane wax from clarification muds, or other sugar cane factory waste products by the use of organic solvents, such as toluene. Several investigators have separated crude sugar cane wax into a soluble fraction and a hard wax fraction; one recent method is described in U. S. Patent No. 2,381,420 to Balch. By this method chipped or broken crude wax pieces are placed in a container and covered with a fat solvent, such as acetone, and the fatty portions are separated from the crude wax by a process of diffusing into the solvent. Another method has been recently described in U. S. Patent No. 2,391,893 to Geopfert. According to this method sugar cane wax is separated from "mud" by the use of certain lower alkyl propionates.

n my co-pending application Serial No. 683,136, filed July 12, 1946 in the United States Patent Office, now Patent No. 2,456,655, I have disclosed and claimed a process for separating crude sugar cane wax into three fractions: (1) soft fraction, (2) hard wax fraction, and (3) resinous fraction.

Furthermore, in my co-pending application Serial No. 683,137, filed July 12, 1946 in the United States Patent Office now Patent No. 2,456,655, I have disclosed and claimed a process for recovering the hard wax fraction from crude sugar cane wax.

Now, in accordance with my invention, I have developed a process for removing the resinous fraction from the hard wax fraction. The so-called resinous fraction is a black pitch-like material with no definite melting point, but which softens at temperatures varying from about 100° to 160° C. This method is equally applicable in removing the resinous fraction from sugar cane wax irrespective of what method was used in obtaining the hard fraction from the crude sugar cane wax.

My method comprises contacting sugar cane wax from which the soft fraction has been removed, with a liquid fat solvent, heating said mixture sufficiently to put the wax fraction into solution, while keeping the solvent in liquid phase, and separating the resinous fraction from the wax fraction.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

One hundred pounds of crude sugar cane wax was melted, filtered to remove any solid foreign matter, and mixed with 71 pounds of liquid acetone which had been heated under pressure to a temperature of 98° to 100° C. The solution of acetone and crude wax at about 100° C. was injected into an agitated vessel containing a slurry which consisted of a suspension of solid hard wax fraction in a solution of the soft fraction in acetone. The temperature of the slurry was about 25° to 30° C. This temperature was maintained by connecting the vessel to a reflux condenser which in turn is connected to a vacuum line. The vacuum was held at 240 mm. of Hg. absolute which caused the acetone to boil at 25° to 30° C. The heat introduced into the vessel was thus removed by the vaporizing acetone which then passed to the reflux condenser and was returned to the vessel as condensate. As the hot acetone-crude wax solution was injected into the slurry, the acetone flashes, thus cooling and solidifying the crude wax to form more slurry. Further cooling was effected by contact of the hot entering stream with the relatively cold slurry.

Four hundred two pounds of additional acetone was introduced into the vessel at a rate sufficient to give the desired concentration of slurry. The hot acetone-crude wax solution and the additional acetone was fed continuously into the vessel. The slurry produced in this manner was easily filterable and was filtered in conventional filtration equipment. The filter cake was washed with an additional 400 pounds of acetone. The filtrate containing the soft fraction weighed 705 pounds and was evaporated in conventional evaporating equipment. Thirty-three pounds of soft fraction was recovered. This soft fraction was a dark green oil at room temperature.

The filter cake containing the hard wax fraction resulting from the filtration of the slurry weighing 268 pounds was repulped with 335 pounds of acetone. The resulting slurry was then heated to a temperature of about 100° C. under sufficient pressure to keep the acetone in liquid form at which temperature the wax fraction was all in solution. Upon heating almost instantaneously two immiscible phases formed, the light layer weighing 577.6 pounds contained the waxy fraction, and the heavy layer weighing 25.4 pounds contained the resinous fraction. The two immiscible phases were separated by decantation. The light layer was then evaporated, the final traces of acetone being removed in a batch vacuum evaporation. The residue left after evaporation was a brittle, brown waxy fraction having a melting point of about 75° C. which weighed 54.9 pounds. The heavy layer was removed to a flash chamber by which the acetone was removed. Substantially all of the relatively small amount of acetone present flashed into vapor. The balance was removed by drawing a vacuum on the vessel for a short time, meanwhile supplying heat to it. The solids recovered constituted a black pitch-like resinous fraction weighing 12.1 pounds with no definite melting point but which softened at temperatures varying from about 100° to 160° C.

*Example 2*

Example 1 was repeated except that methylethylketone was substituted for the acetone as the fat solvent. It was the equivalent of acetone as a fat solvent for use in this process.

*Example 3*

Commercially available sugar cane wax was substituted for the filter cake containing the hard wax fraction in Example 1, and treated with acetone in accordance with the method of Example 1. The resinous fraction removed was found to be substantially identical with that of Example 1 and the brown waxy fraction had a melting point of about 75° C.

From the foregoing examples a method has been illustrated by which the resinous fraction can be removed from sugar cane wax, and in addition in Example 1, a method has been disclosed for obtaining the hard wax fraction from crude sugar cane wax. This method of obtaining the hard wax fraction is that heretofore referred to as disclosed and claimed in my copending application Serial No. 683,137, filed July 12, 1946.

While acetone and methylethylketone have been shown as the fat solvents, the invention is not so limited. Although these solvents are preferred, other known fat solvents such as ethyl ether, hexane, heptane, pentane, and the like may be used.

The amount of fat solvent used in forming the slurry or mixture of hard fraction is about 4 pounds upward of fat solvent per pound of solids. In practice a ratio of about 4 to about 8 pounds of fat solvent per pound of solids is preferred.

The slurry is heated to a temperature sufficient to place the wax fraction in solution. Since it is necessary to maintain the fat solvent in liquid phase, in the event that the fat solvent used has a boiling point of less than 75° C., e. g. acetone, it will be necessary to carry out the heating under pressure. While the minimum temperature at which the slurry is heated should be about 75° C., the upper temperature limit will depend upon the ability of the wax to withstand the temperature. Operation at a higher temperature than is necessary to insure that the wax is placed in solution, has the disadvantage of increasing the amount of heat required, as well as increasing the pressure necessary to maintain the fat solvent in liquid phase. For the practical reason of easy operation, a temperature of from about 75° to 125° C. is recommended, although a temperature of about 100° C. has been used in carrying out the examples.

It has been found that much better results are obtained by heating the repulped slurry than by heating small pieces of hard fraction and solvent. In the latter case the small particles of hard fraction become coated with sticky resinous fraction and the whole particle settles, thus occluding some of the wax fraction.

Upon heating the slurry gives almost instantaneous two immiscible phases which can be separated, for example, by decantation, either by batch or a continuous method. In practice, it has been found convenient to separate the light layer containing the waxy fraction continuously. This light layer is then evaporated in conventional evaporating equipment to remove the fat solvent with the final traces preferably removed in a batch vacuum evaporator or by stripping. The residue left after evaporation of the acetone is the waxy fraction having a melting point of about 75° C.

The heavy layer or resinous solution is preferably withdrawn periodically into a receiver from which it may be blown from its condition of high temperature into another vessel at low pressure. In this process substantially all of the relatively small amount of fat solvent present in the solution flashes into vapor. The balance is then removed by drawing a vacuum on the vessel while supplying heat to it. The solids which collect in the flash chamber may be removed periodically. These solids constitute the resinous fraction which has no definite melting point but which softens at a temperature from 100° to 160° C.

Other methods of recovering the waxy fraction and the resinous fraction may be used if desired.

From the foregoing it will be seen that a practical method has been developed for refining ordinary sugar cane wax to remove the resinous material. The resulting refined sugar cane wax has improved properties for bleaching, decolorizing, emulsification, etc. The method developed lends itself to continuous separation, or batch, as desired.

I claim:

1. A process for removing the resinous fraction from sugar cane wax comprising contacting sugar cane wax from which the soft fraction has been removed, with a liquid fat solvent selected from the group consisting of acetone, methylethylketone, ethyl ether, pentane, hexane, and heptane, the ratio of said solvent to solids by weight being at least 4:1, heating said mixture sufficiently to put only the wax fraction into solution while keeping the solvent in liquid phase, and separating the resinous fraction from the wax fraction.

2. A process for removing the resinous fraction from sugar cane wax comprising contacting sugar can wax from which the soft fraction has been removed, with acetone, the ratio of said acetone to solids by weight being at least 4:1, heating said slurry sufficiently to put only the wax fractions into solutions while keeping the acetone in liquid phase, and separating the resinous fraction from the wax fraction.

3. A process for removing the resinous fraction from sugar cane wax comprising contacting sugar cane wax from which the soft fraction has been removed, with methylethylketone, the ratio of said methylethylketone to solids by weight being at least 4:1, heating said slurry sufficiently to put only the wax fraction into solution while keeping the methylethylketone in liquid phase, and separating the resinous fraction from the wax fraction.

4. A process for removing the resinous fraction from sugar cane wax comprising forming a wax-acetone mixture, the ratio of said acetone to solids by weight being at least 4:1, heating said mixture sufficiently to put only the wax fraction into solution while keeping the acetone in liquid phase, and separating the resinous fraction from the wax fraction by decanting.

5. A process for removing the resinous fraction from sugar cane wax comprising forming a wax-methylethylketone mixture, the ratio of said acetone to solids by weight being at least 4:1, heating said mixture sufficiently to put only the wax fraction into solution, while keeping the methylethylketone in liquid phase, and separating the resinous fraction from the wax fraction by decanting.

OSCAR J. SWENSON.

REFERENCES CITED

The following references are of record in the file of this patent:

UNITED STATES PATENTS

| Number | Name | Date |
| --- | --- | --- |
| 2,118,454 | Schaafsma | May 24, 1938 |
| 2,381,420 | Balch | Aug. 7, 1945 |
| 2,391,893 | Goepfert | Jan. 1, 1946 |